Patented Nov. 26, 1940

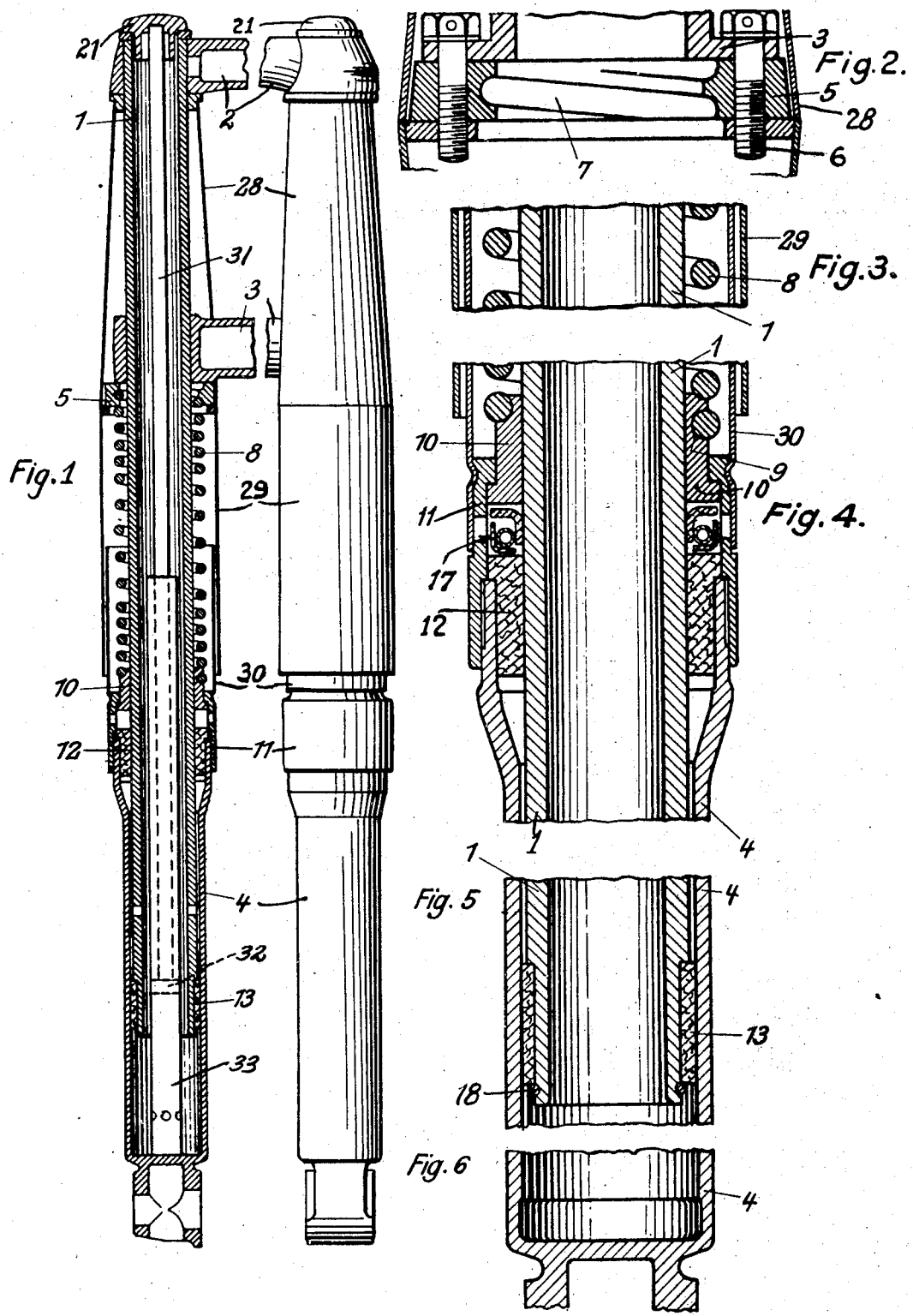

2,223,187

UNITED STATES PATENT OFFICE 2,223,187

MOTORCYCLE FORK

Rudolf Schleicher, Munich, Germany, assignor to the firm: Bayerische Motoren Werke Aktiengesellschaft, Munich, Germany Application November 1, 1938, Serial No. 238,149
In Germany November 1, 1937

11 Claims. (Cl. 267—34)

The invention relates to motorcycle forks with liquid damping, especially those forks which consist of tubes sliding one within the other, and relatively sprung and wherein the lower movable fork parts, carrying the wheel axle, engage over the stationary fork parts carried by the frame.

An object of this invention is the provision of simplified and sturdy sprung forks for vehicles, such as motorcycles.

Another object of this invention is the provision of a sprung fork which is inexpensive to manufacture, in which all of the parts are readily accessible, and which is still extremely rigid in construction.

Still another object of this invention is to provide a motorcycle fork which is positively sprung for both up and down movement.

A further object of this invention is to provide a sprung fork which includes simple shock absorbing and damping means.

An example of construction of the invention is shown diagrammatically in the accompanying drawing wherein:

Fig. 1 is a front vertical view of a fork, one leg of which is shown in cross-section; and Figs. 2 to 6 show various partial sections of one leg of the fork in Fig. 1 on a larger scale.

The fork, according to the example of construction has a pair of depending legs in the same way as other forks. Each leg consists, according to the invention, of the stationary tube 1 which is rigidly held in place in the upper and lower sprung fork guides 2, 3, forming the fork head, and the unsprung lower sliding tube 4 connected to the wheel axle in a known manner by a stub axle (not shown). To the lower transverse bar 3 of the stationary fork tube there is rigidly connected by any suitable means such as screw bolts 6, an upper spring clamping member 5, and in the grooves 7, provided in the form of a screw thread in the interior of the clamping member 5, there is screwed the spring 8. The lower end of the spring 8 also engages with screw-shaped grooves 9 on the outer periphery of a bush 10 which slides on the stationary tube 1 and is connected to the lower tube 4, by a cap nut 11. As an upper guide for the outer movable fork tube 4 on the stationary tube 1 there is provided a bush 12, which is also held in the tube 4 by a cap nut 11 together with the packing 17, whilst as lower guide there is provided a bush 13 fitted on the tube 1. The bush 13 is preferably mounted in a cut-out portion on the lower end of the tube 1 and held in place by a spring ring 18, as is best seen in Fig. 5. Preferably the two bushes 12 and 13 are constructed of friction damping ferrocellular material requiring little lubrication. Both fork tubes are protected in the known manner by protecting sleeves 28, 29 and 30 from the penetration of dust and moisture.

The sprung fork, as above described, lends itself readily to the inclusion of a shock absorber, such as the hydraulic shock absorber described in my co-pending application S. N. 238,150, filed November 1st, 1938. Such a shock absorber has been indicated in Fig. 1 wherein a piston rod 31 is attached in any suitable manner to the cap 21 closing the upper end of the tube 1. A piston 32 connected to the lower end of the rod 31 is slidably mounted in another tubular member 33, rigidly interconnected by suitable means (not shown) with the lower tube 4.

While the form of the mechanism here shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

Having thus described the invention, what I claim and desire to secure by Letters Patent is:

1. In a springing unit for the leg of a motorcycle fork having relatively sprung and unsprung parts, the combination of a pair of vertically spaced sprung members, a depending tube rigidly interconnected at its upper end with both of said sprung members, a second tube slidably mounted on said first tube and connected to the unsprung part, a helical spring surrounding said first tube, and means interconnecting the ends of said spring with the top of said second tube and the lower of said spaced sprung members.

2. In a springing unit for a motorcycle fork having relatively sprung and unsprung parts, a depending tube rigidly interconnected at its upper end with the sprung parts, a second tube slidably mounted on said first tube and connected to the unsprung parts, a helical spring surrounding said first tube, and means interconnecting the ends of said spring with the top of said second tube and the sprung parts of said fork, said means including a threaded collar for receiving the end of said spring, said collar being slidably mounted on said first tube, and a cap nut engaging said collar and threadably connected to said second tube.

3. In a springing unit for the leg of a motorcycle fork having relatively sprung and unsprung parts, the combination of a pair of vertically spaced sprung members, a depending tube rigidly interconnected at its upper end with both of said sprung members, a second tube slidably mounted on said first tube and connected to the unsprung part, a dampening bushing intermediate the upper portion of said second tube and said first tube for frictionally guiding said tubes relatively to one another, a helical spring surrounding said first tube, and means interconnecting the end of said spring with the top of said second tube and the lower of said spaced sprung members.

4. The combination according to claim 3, in combination with shock absorber means interconnecting the upper of said spaced sprung members with said unsprung part and mounted within said tubes.

5. In a springing unit for a motorcycle fork having relatively sprung and unsprung parts, a depending tube rigidly interconnected at its upper end with the sprung parts, a second tube slidably mounted on said first tube and connected to the unsprung parts, a dampening bushing intermediate the upper portion of said second tube and said first tube for frictionally guiding said tubes relatively to one another, a helical spring surrounding said first tube, and means interconnecting the end of said spring with the top of said second tube and the sprung part of said fork, said means including a threaded collar for receiving the end of said spring, and a cap nut engaging said collar and threadably connected to said second tube about said bushing.

6. The combination according to claim 3, in combination with a further dampening bushing intermediate the lower end of said first tube and said second tube.

7. The combination according to claim 1, in which the means for interconnecting said spring with said sprung part includes a member threaded to receive the end of said spring and rigidly attached to said lower sprung member.

8. The combination according to claim 3, in which the means for interconnecting said spring with said sprung part includes a member threaded to receive the end of said spring and rigidly attached to said lower sprung member.

9. The combination according to claim 5, in which said cap nut is formed with an outer annular depression, in combination with a covering sleeve for said spring having an inwardly pressed portion cooperating with said annular depression to releasably connect said sleeve to said cap nut.

10. In a springing unit for a motorcycle fork having relatively sprung and unsprung parts, a depending tube rigidly interconnected at its upper end with the sprung part and having an annular cut-out portion at its lower end, a second tube slidably mounted on said first tube and connected to the unsprung part, a dampening bushing intermediate the upper portion of said second tube and said first tube for frictionally guiding said tube relatively to one another, a second dampening bushing mounted in said annular cut-out portion intermediate the lower end of said first tube and said second tube, a spring ring surrounding the lower end of said first tube and holding said second dampening bushing in said annular cut-out portion, a helical spring surrounding said first tube, and means interconnecting the end of said spring with the top of said second tube and the sprung part of said fork.

11. Front wheel fork for motorcycles or the like, comprising a fork head having a pair of depending legs, each leg consisting of a pair of telescoped tubes of which the inner tube is rigidly interconnected with said fork head, means at the lower end of the outer tube adapted to receive a wheel-supporting axle, and a spring surrounding the inner tube and positively interconnecting the top of the outer tube with said fork head so that the wheel supporting axle is sprung relatively to said fork head under tension and compression of said spring.

RUDOLF SCHLEICHER.